E. KEEN.
APPARATUS FOR PRODUCING ANIMATED DRAWINGS.
APPLICATION FILED OCT. 9, 1916.
1,260,393.
Patented Mar. 26, 1918.
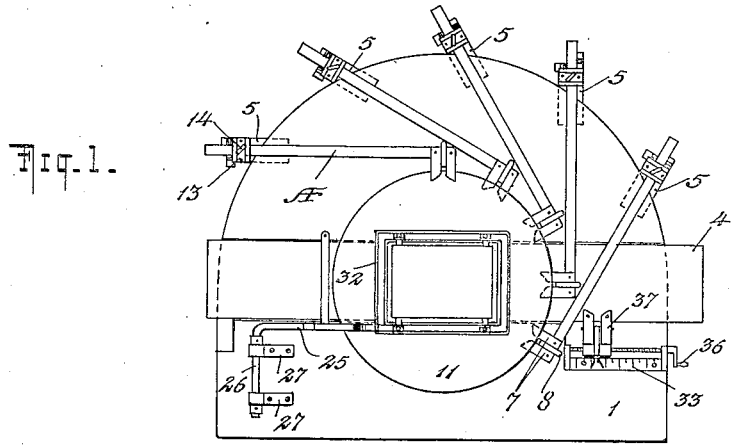
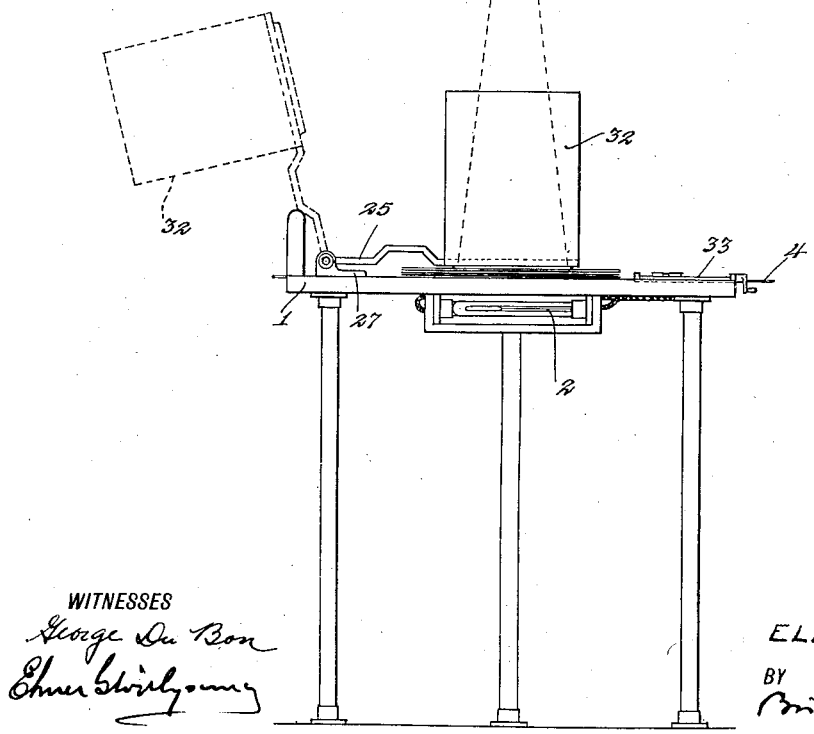
WITNESSES
INVENTOR
ELIOT KEEN
BY
ATTORNEYS

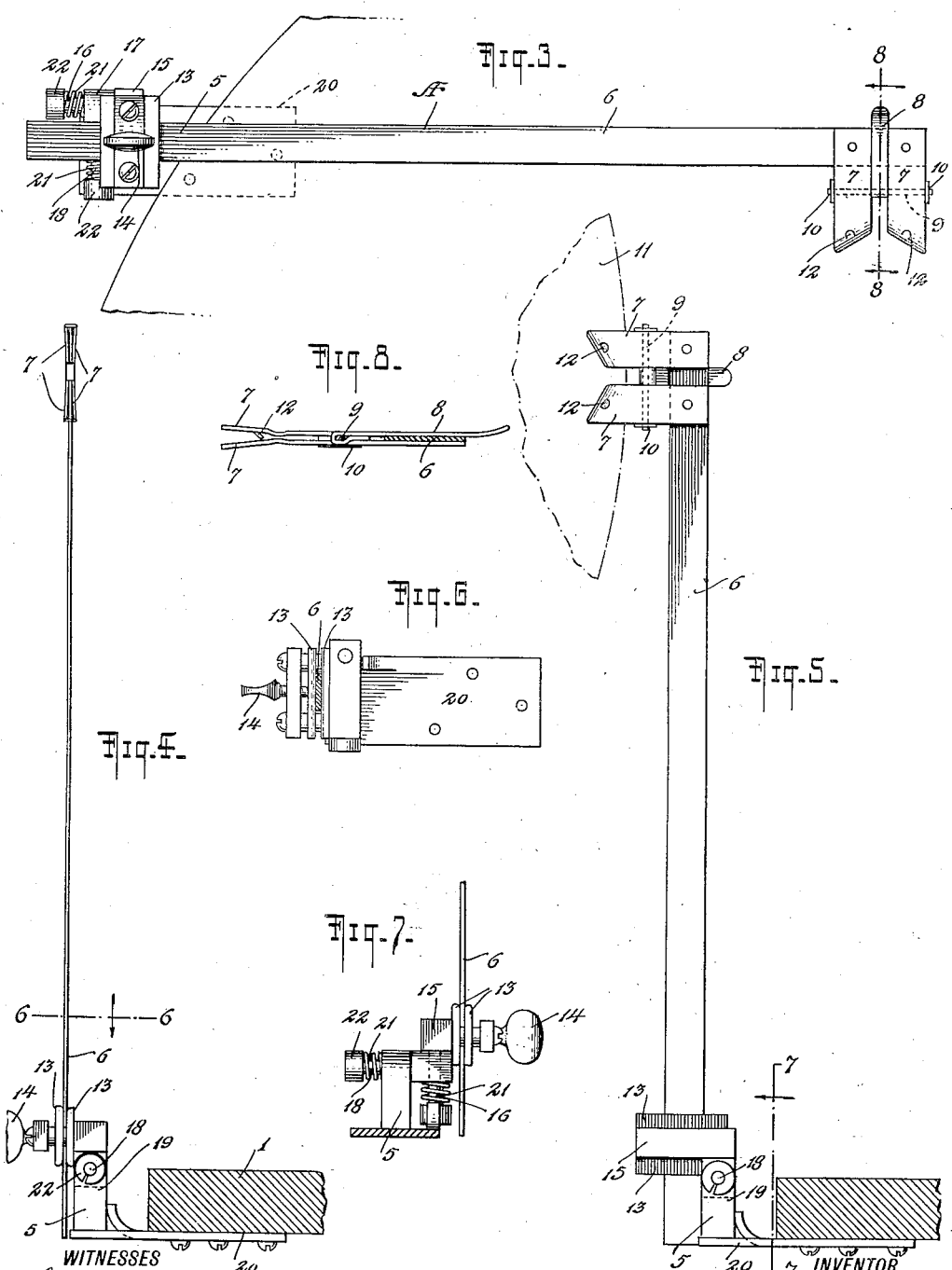

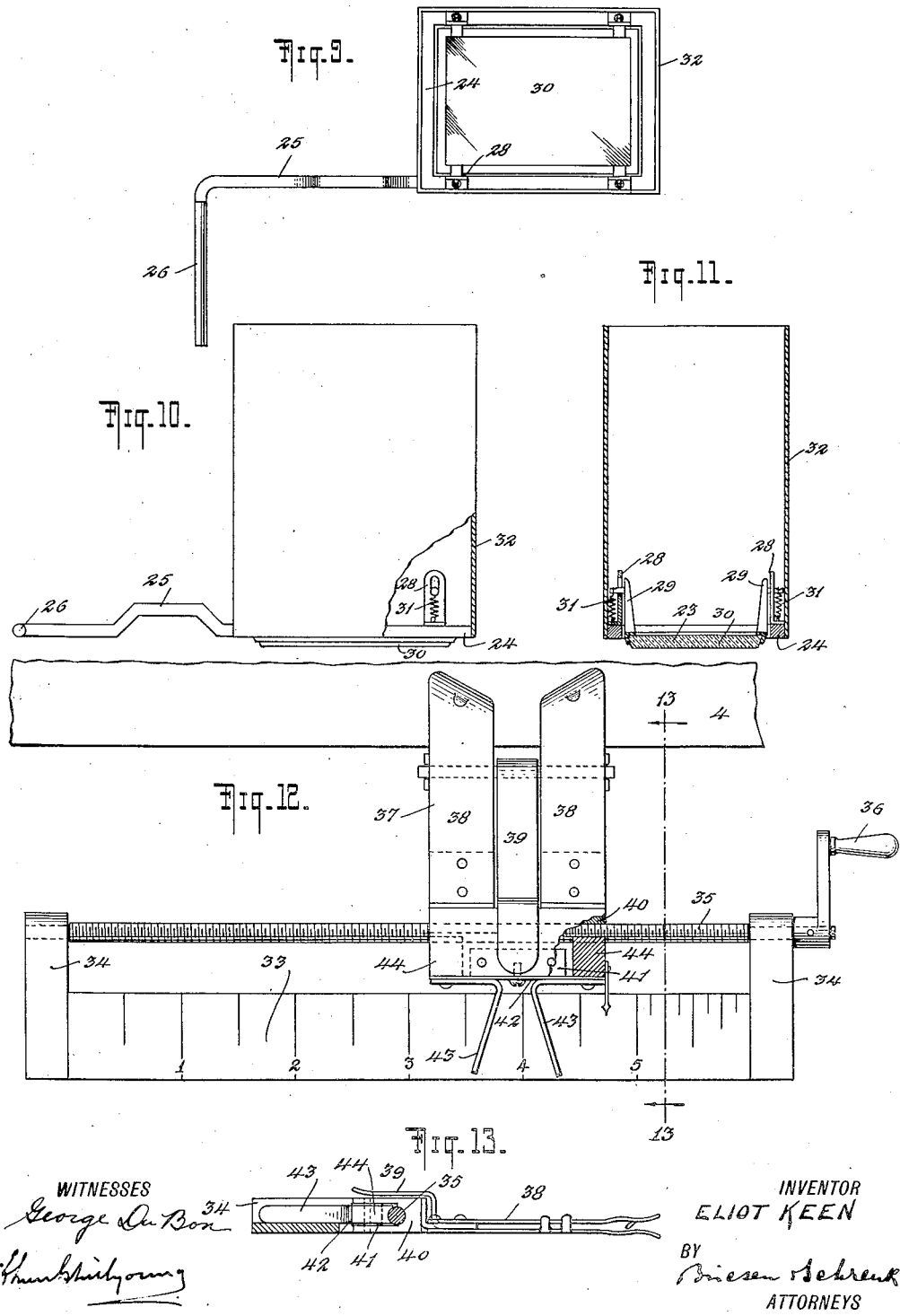

UNITED STATES PATENT OFFICE.

ELIOT KEEN, OF BROOKLYN, NEW YORK, ASSIGNOR TO WILLIAM P. DUNHAM, OF NEW YORK, N. Y.

APPARATUS FOR PRODUCING ANIMATED DRAWINGS.

1,260,393.     Specification of Letters Patent.     Patented Mar. 26, 1918.

Application filed October 9, 1916. Serial No. 124,629.

*To all whom it may concern:*

Be it known that I, ELIOT KEEN, a citizen of the United States, residing in the county of Kings, borough of Brooklyn, city and State of New York, have invented certain new and useful Improvements in Apparatus for Producing Animated Drawings, of which the following is a specification.

My invention relates to apparatus for producing moving pictures of the kind commonly known as animated drawings in which the pictures are ordinarily photographed from a series or sequence of individual drawings which differ more or less from one another to an extent sufficient to give an effect, when transferred to a film and suitably projected, of action and motion which will appeal to the taste and imagination and afford satisfactory entertainment. In pictures of this kind it is clear that effects may be produced which would be impossible if dealing with real people and objects since inanimate as well as animate objects may be given movement and may be made to assume positions of any desired character.

More particularly, my invention relates to certain improvements in earlier apparatus invented by me for the purpose of producing animated drawings; such earlier apparatus constitutes the subject matter of an application for a patent filed April 7, 1916, Serial No. 89,523.

In the apparatus constituting the subject matter of my previous application just referred to, I employ a plurality of relatively thin and preferably flexible sketch sheets of translucent material such as celluloid. Upon one of these plates I draw so much of the background of the proposed picture as was to remain permanently unchanged, or unchanged for a sensible period of time. And upon each of the other plates I similarly draw a part of other features of the picture. By then placing the plates in contact, and in such relative location in their substantially common plane as to cause the several parts of the picture to register or coalesce in a selected attitude, and then making a photographic exposure through the assembly of plates, I secure one picture of the series necessary to a complete film. I then move the several plates in their own plane so as to place the several parts in proper relative position to give the impression of the desired motion when properly displayed as a part of the sequence of the completed set of pictures, and then make a second exposure; and so on indefinitely. If at any time it proves impossible to secure a picture suitable for exposure by merely shifting the individual plates, I then either employ an extra plate or plates with new parts of the picture drawn thereupon or I erase and redraw portions of the picture appearing upon one or more plates.

In practice the several plates carrying the individual parts of the completed picture are appropriately held in place by special holders which permit them to be shifted with reference to one another as desired or to be entirely removed from the field of exposure while, at the same time, being positively held so that they can always be instantly replaced in said field in the position they had before removal. The holder also permits any particular plate to be brought to the top for erasure or alteration. In my former apparatus, however, certain disadvantages attended the particular form of plate carrying holders employed and it is one of the purposes of the present invention to avoid such disadvantages by employing a different and improved type of holder.

Another purpose of the present invention is to provide improved means for pressing various plates carrying separate parts of the picture closely together during the operation of making the exposure, thus precluding any possibility of individual plates springing away from one another so as to throw the picture parts upon some of the plates out of focus.

Still another object of the present invention is to provide an improved means for shifting one plate a definite amount with reference to another plate or to a set of other plates when it is necessary to produce the illusion of continuous motion.

My invention will be better understood by referring to the accompanying drawings in which Figure 1 represents a plan view of an apparatus embodying my improvements; Fig. 2 represents a front elevation of the apparatus of Fig. 1; Fig. 3 represents, on an enlarged scale, a plan view of one of my improved holders; Fig. 4 is a front elevation of the holder of Fig. 3, the holder being shown in its vertical position; Fig. 5 is a view similar to Fig. 4 but showing the holder rotated about its vertical axis through 90°; Fig. 6 is a section taken along the line 6—6 of Fig.

4; Fig. 7 is a section taken along the line 7—7 of Fig. 5 and Fig. 8 is a section taken along the line 8—8 of Fig. 3; Fig. 9 is a plan view of the pressure plate and dark box taken from below; Fig. 10 is a front elevation of Fig. 9; Fig. 11 is a section taken along the line 11—11 of Fig. 10; Fig. 12 represents a plan view of a device for shifting one picture with reference to another by definite amounts; and Fig. 13 represents a section taken along the line 13—13 of Fig. 12.

Referring to the drawings, a suitable table 1 has a central recessed opening in which is fitted a rectangular sheet of frosted glass or the equivalent. Immediately below the glass is mounted suitable illuminating means 2, preferably electric, and at a suitable distance above the opening is mounted a picture taking camera 3 of the usual type.

Arranged to slide transversely across the table and over the opening therein is a translucent celluloid sheet 4 which I term the background sheet and upon which is commonly drawn the background of the picture and such other parts as are intended to remain unchanged for a reasonable time.

The back of the table is semi-circular in outline and carries a suitable number of my improved holders 5.

Each holder 5 comprises a, preferably, flexible leaf spring 6 of suitable length carrying at its outer end a pair of spring clamps 7, 7. Each of the spring clamps consists of a pair of spring metal members attached to opposite sides of strip 6 and preferably given an initial set so that their outer ends are pressed strongly together. The clamps 7 are spaced from one another by a clamp opening device comprising a lever 8 carrying a flat bar 9, the ends of which are pivoted at 10, 10, on each side of the clamps 7, 7. When the lever 8 is raised the clamps 7 are opened and when the lever 8 is lowered the clamps 7 are allowed to press forcibly together.

The circular celluloid plates 11 upon which individual parts of the picture are drawn are slid in between the opposed members of spring clamps 7 as indicated in Figs. 1 and 5 and the clamp members are then allowed to come together. Indentations 12 in the clamp springs press into the substance of the plates 11 and hold them firmly in position.

The inner end of strip 6 is held longitudinally adjustable, between clamp bars 13 controlled by the clamp screw 14 and attached to a bar 15, one end of which is provided with a right angled shaft 16 which is rotatably held in a boss 17 itself constituting the end of a shaft 18 which is rotatably held in a standard 19 erected from a bracket 20 by means of which the holder 5 is attached to the table 1.

Springs 21 upon the two shafts 16 and 18 are held in tension by adjustable nuts 22 upon the outer ends of the shafts, thus causing said shafts to stay put, when rotated, by reason of the friction thus produced between each shaft and its bearings.

In operation the several celluloid plates 11 are presumed to have parts of a picture drawn thereupon. To locate and hold the said plates in their proper relative positions with reference to one another and to the illuminated opening in the table 1 they are handled, one at a time, as follows: A given plate 11 (the plate of Fig. 1, e. g.) is oriented and positioned upon the table so as to suitably locate the picture which may be upon it. The strip 6 of a holder 5 is then shifted lengthwise until its clamps 7, 7 will slip over the edge of the plate when said clamps are allowed to come together. Clamp screw 14 is then tightened up so as to prevent any further movement of strip 6. The same procedure may then be applied to each of the other plates 6.

The clamp bars 13 operate upon opposite guides which are substantially farther apart than the width of the strip 6 so that said strip may be angularly shifted in either direction in its plane at right angles to its own length, as well as linearly, thereby permitting any plate 11 to be moved either toward the front or back of table 1.

The plates 11 being one upon the other in any given order, any given plate can be brought to the top so as to be shifted with respect to the picture parts shown on the other plates, or altered with respect to the picture part drawn upon it, by successively operating the holders 5 to get the several plates, including the plate in question, out of the flat position. The other plates are then again replaced, one upon the other, and the plate to be operated upon is replaced last so as to be at the top.

This manipulation of plates is preferably accomplished as follows:

The top plate 11 is thrown directly upward until its plane is vertical by causing the movable parts of the table attaching joint of holder 5 to rotate about axis 18. This puts the holder in the position shown in Fig. 4. The plate and strip 6 may then be rotated about the vertical and longitudinal axis of the strip by rotating the movable part of the joint about the axis 16. Preferably the plates should be so set that they are substantially tangent to the curvature at the rear of the table. In this position none of the plates interfere with one another and the holder of any particular plate may be moved so as to replace the plate in exactly the same position in the plane of the table that it had before the plates were lifted. Several plates may be replaced, one on top of another, in any desired order and so as to bring uppermost any particular plate which it is desired to alter. If, for any purpose, it should be desired to merely rotate a given plate, this may be accomplished by loosening the clamps 7 and turning the plate 11 therein without shifting its position from the plane of the table.

Thin celluloid plates are rarely found absolutely flat. As a consequence, when the several plates 11 are placed one upon the other so as to merge portions of the picture drawn upon the different plates, the several plates of the pile are likely to be mutually pressed apart, to a greater or less extent so that any picture taken through the pile of plates is apt to have some portions which are accurately in focus while other portions are out of focus.

To avoid this disadvantage, my present machine is provided with a pressure plate 23 comprising a preferably rigid rectangular frame 24 having a bracket arm 25 which terminates in a shaft 26 held rotatably in bearings 27 attached to the table. Slotted standards 28 are carried by frame 24 and serve as guides for pins attached to brackets 29 carried by a rim inclosing a piece of plate glass 30. Springs 31 normally cause the plate glass to project downwardly below the frame. When all of the several plates 11 are suitably positioned so as to form a picture ready to be photographed, the pressure plate is thrown down into position thus causing the glass 30 to press firmly upon the pile of plates 11 and to bring them all into substantially one plane.

It is almost as necessary to bring all the several plates 11 into substantially one plane to observe the assembly effect of the plates in order to determine whether they constitute a perfect picture as it is to have the plates pressed together during the actual exposure. For this reason I prefer to combine a dark box with the pressure plate. This dark box comprises an open ended hood 32 of cardboard or light sheet metal attached to the frame 24. When the pressure plate is pressing upon the plates 11, the dark box effectually excludes all extraneous illumination.

In making animated drawings, it is often necessary to take a considerable number of successive pictures so as to present the effect of continuous motion with respect to a background. This happens, for example, when it is desired to show the movement of a locomotive or automobile, or of a running man. In such cases it is obvious that the moving object must be kept constantly in the foreground and that the background must be altered for each successive picture. In making animated drawings with my improved apparatus, I find it desirable to first draw a continuous or panoramic background upon the background strip 4. One or more plates 11 which, continued, have the moving object upon them are then placed over the background sheet. By then moving the background sheet in a suitable direction and by a suitable amount for each successive exposure or picture, the effect of continuous motion aimed at is readily obtained. To obtain this effect of smooth and continuous motion, however, it is necessary that the movement of the background for each successive picture shall, although very small, be accurately determined. To accomplish this, I provide a background adjuster 33 comprising a suitably graduated scale having end pieces 34 which constitute bearings for a rotatable threaded shaft 35 operated by a crank 36. Upon this shaft is carried a background clamp 37 comprising pairs of spaced springs 38 similar to the plates 7 belonging to the holders 5. These springs are normally pressed together but are adapted to be separated by means of a lever 39 as described for the plate 7 of the holder 5. A bearing member 40 having a deep slot at the base of which is a semi-circular screw thread adapted to mesh with the screw thread of shaft 35 is fastened to the spring members 38. This bearing member carries a block 41 spaced from shaft 35 to which is centrally attached a short leaf spring 42 having finger pieces 43 attached thereto. The inner side of the leaf spring carries at its opposite ends short blocks 44 which are also threaded to mesh with the threads of shaft 35. When the parts are in the position shown in Fig. 12, the background clamp is locked to shaft 35 and can be moved thereon with respect to the graduated scale by use of the crank 36. In operation, therefore, it is merely necessary to know how far the background is to be moved for each successive picture. This being known, the crank is suitably turned between the pictures so as to give the desired result.

If at any time it is desired to shift the background plate through a considerable distance, the finger pieces 43 are pressed together so as to release the threaded members 44, 44, and the background sheet is pushed along by hand the desired distance when the pressure is moved from the finger pieces so as to again lock the background clamp to shaft 35.

While I have shown and described preferred forms of my improvements, those skilled in the art will readily be able to alter details without departing from the spirit of the invention as defined in the following claims:

1. In apparatus for making animated drawings comprising a plurality of translucent sheets adapted to be placed one upon another said sheets having picture parts thereupon, the combination of a table, and holders, attached to the table, for said plates, each holder comprising a strip carrying a clamp at one end adapted to grip a plate and being pivotally attached to the table at the other end.

2. In apparatus for making animated drawings comprising a plurality of translucent sheets adapted to be placed one upon another said sheets having picture parts thereupon, the combination of a table, and holders, attached to the table, for said plates, each holder comprising a strip carrying a clamp at one end adapted to grip a plate and having table attaching means at the other end said attaching means permitting the strip to be rotated upon either of two axes one being parallel to the strip and the other at right angles thereto but in the plane of the strip.

3. In apparatus for making animated drawings comprising a plurality of translucent sheets adapted to be placed one upon another said sheets having picture parts thereupon, the combination of a table, and holders, attached to the table, for said plates, each holder comprising a linearly adjustable strip carrying a clamp at its outer end adapted to grip a plate and a table attaching joint at the other end said joint permitting the plate to be rotated about two axes both of which are in its own plane but at right angles to one another.

4. In apparatus for making animated drawings comprising a plurality of springy translucent sheets adapted to be placed one upon another said sheets having picture parts thereupon, means for maintaining the individual sheets relatively immovable in their common plane, and a light permeable pressure plate arranged to press said sheets closely together over their entire area and adapted to photograph therethrough, as and for the purpose described.

5. In apparatus for making animated drawings comprising a plurality of springy translucent sheets adapted to be placed one upon another said sheets having picture parts thereupon, means for maintaining the individual sheets relatively immovable in their common plane, and a light permeable pressure plate having an attached hood arranged to press said sheets closely together, as and for the purpose described.

6. In apparatus for making animated drawings comprising translucent sheets containing picture parts, one sheet upon another, means for maintaining the individual sheets relatively immovable in their common plane and means for intermittently moving one of said sheets by accurately determined amounts in said plane with respect to the other sheets.

In testimony whereof I have hereunto set my hand.

ELIOT KEEN.